United States Patent
Hata

(10) Patent No.: US 6,430,368 B1
(45) Date of Patent: Aug. 6, 2002

(54) AUTOFOCUS APPARATUS

(75) Inventor: Daisuke Hata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/642,906

(22) Filed: Aug. 22, 2000

(30) Foreign Application Priority Data

Aug. 27, 1999 (JP) .......................................... 11-242307

(51) Int. Cl.[7] .............................................. G03B 17/00
(52) U.S. Cl. .......................................... 396/79; 396/77
(58) Field of Search .......................... 396/77, 79, 123, 396/133, 137, 104

(56) References Cited

U.S. PATENT DOCUMENTS

| | | | | |
|---|---|---|---|---|
| 4,083,056 A | * | 4/1978 | Nakamura et al. | 396/112 |
| 4,523,829 A | | 6/1985 | Eguchi et al. | |
| 5,767,989 A | | 6/1998 | Sakaguchi | |

FOREIGN PATENT DOCUMENTS

| | | |
|---|---|---|
| EP | 0 401 859 | 12/1990 |
| EP | 0 437 629 A1 | 7/1991 |
| JP | 1-206141 | 8/1989 |
| JP | 03-068280 | 3/1991 |
| JP | 03-070273 | 3/1991 |
| JP | 3-204973 | 9/1991 |

* cited by examiner

*Primary Examiner*—Russell Adams
*Assistant Examiner*—Arthur A Smith
(74) *Attorney, Agent, or Firm*—Oblon, Spivak, McClelland, Maier & Neustadt, P.C.

(57) ABSTRACT

The autofocus apparatus has a first mode of shifting a focus lens at a fine step interval so as to sample an AF evaluation value, and for detecting an in-focus position on the basis of a sampling AF evaluation value; and a second mode of shifting the focus lens at a coarse step interval so as to sample an AF evaluation value, and detecting a rough in-focus position on the basis of the sampling AF evaluation value, and subsequently, shifting the focus lens at a fine step interval so as to sample an AF evaluation value in the vicinity of the rough in-focus position, and detecting an in-focus position on the basis of the sampling AF evaluation value, and further, can select the first mode and the second mode.

10 Claims, 17 Drawing Sheets

FIG.3

| ENA | IN1 | IN2 | OUT1 | OUT2 | OUT3 | OUT4 | NOTES |
|---|---|---|---|---|---|---|---|
| L | — | — | OFF | OFF | OFF | OFF | WAITING STATE |
| H | L | L | H | L | H | L | TWO-PHASE EXCITATION |
| H | L | H | H | L | L | H | |
| H | H | H | L | H | L | H | |
| H | H | L | L | H | H | L | |

FIG.6

| SETTING PIXEL ASPECT RATIO | 1 AF STEP (FINE ADJUSTMENT) | COARSE ADJUSTMENT |
|---|---|---|
| 1800×1200 | 2 PULSES | 6 PULSES (THREE TIME OF FINE ADJUSTMENT) |
| 900×600 | 3 PULSES | 9 PULSES (THREE TIME OF FINE ADJUSTMENT) |

| L (m) | Z1=8 1AF-STEP 0.029 AF STEP NUMBER (STEP) | Z1=8 1 DV PERIOD 0.033333 AF SAMPLING TIME(S) | Z2=9 1AF-STEP 0.029 AF STEP NUMBER (STEP) | Z2=9 1 DV PERIOD 0.033333 AF SAMPLING TIME(S) | Z3=10 1AF-STEP 0.029 AF STEP NUMBER (STEP) | Z3=10 1 DV PERIOD 0.033333 AF SAMPLING TIME(S) | Z4=11 1AF-STEP 0.029 AF STEP NUMBER (STEP) | Z4=11 1 DV PERIOD 0.033333 AF SAMPLING TIME(S) | Z5=13 1AF-STEP 0.029 AF STEP NUMBER (STEP) | Z5=13 1 DV PERIOD 0.033333 AF SAMPLING TIME(S) |
|---|---|---|---|---|---|---|---|---|---|---|
| 100 | 0 | 0.00 | 0 | 0.00 | 0 | 0.00 | 0 | 0.00 | 0 | 0.00 |
| 50 | 0 | 0.00 | 0 | 0.00 | 0 | 0.00 | 0 | 0.00 | 0 | 0.00 |
| 30 | 0 | 0.00 | 0 | 0.00 | 0 | 0.00 | 0 | 0.01 | 0 | 0.01 |
| 20 | 0 | 0.01 | 0 | 0.00 | 0 | 0.01 | 0 | 0.01 | 0 | 0.01 |
| 15 | 0 | 0.01 | 0 | 0.01 | 0 | 0.01 | 0 | 0.01 | 0 | 0.01 |
| 12 | 0 | 0.01 | 0 | 0.01 | 0 | 0.01 | 0 | 0.01 | 1 | 0.02 |
| 10 | 0 | 0.01 | 0 | 0.01 | 1 | 0.02 | 1 | 0.02 | 1 | 0.02 |
| 8 | 0 | 0.01 | 1 | 0.02 | 1 | 0.02 | 1 | 0.02 | 1 | 0.03 |
| 7 | 1 | 0.02 | 1 | 0.02 | 1 | 0.02 | 1 | 0.03 | 1 | 0.03 |
| 6 | 1 | 0.02 | 1 | 0.02 | 1 | 0.03 | 1 | 0.03 | 1 | 0.04 |
| 5 | 1 | 0.02 | 1 | 0.03 | 2 | 0.03 | 2 | 0.04 | 2 | 0.05 |
| 4.5 | 1 | 0.03 | 2 | 0.03 | 2 | 0.04 | 2 | 0.05 | 2 | 0.06 |
| 4 | 1 | 0.03 | 2 | 0.04 | 2 | 0.05 | 2 | 0.06 | 2 | 0.07 |
| 3.5 | 2 | 0.04 | 2 | 0.05 | 3 | 0.06 | 3 | 0.08 | 3 | 0.08 |
| 3 | 2 | 0.04 | 3 | 0.06 | 3 | 0.07 | 3 | 0.09 | 3 | 0.10 |
| 2.5 | 2 | 0.05 | 3 | 0.06 | 3 | 0.08 | 3 | 0.09 | 3 | 0.11 |
| 2 | 2 | 0.06 | 3 | 0.07 | 3 | 0.10 | 4 | 0.11 | 4 | 0.12 |
| 1.8 | 2 | 0.07 | 3 | 0.08 | 3 | 0.10 | 4 | 0.12 | 4 | 0.14 |
| 1.7 | 2 | 0.07 | 3 | 0.08 | 4 | 0.11 | 4 | 0.13 | 5 | 0.16 |
| 1.5 | 2 | 0.08 | 3 | 0.09 | 4 | 0.13 | 4 | 0.15 | 5 | 0.17 |
| 1.3 | 3 | 0.09 | 3 | 0.10 | 5 | 0.14 | 5 | 0.16 | 6 | 0.19 |
| 1.2 | 3 | 0.10 | 4 | 0.11 | 5 | 0.16 | 5 | 0.18 | 6 | 0.21 |
| 1.1 | 3 | 0.11 | 4 | 0.13 | 5 | 0.18 | 6 | 0.20 | 7 | 0.23 |
| 1 | 4 | 0.13 | 4 | 0.14 | 6 | 0.21 | 7 | 0.23 | 8 | 0.26 |
| 0.9 | 4 | 0.15 | 5 | 0.17 | 6 | 0.23 | 7 | 0.27 | 9 | 0.30 |
| 0.8 | 5 | 0.16 | 6 | 0.19 | 7 | 0.26 | 9 | 0.30 | 11 | 0.35 |
| 0.7 | 5 | 0.18 | 6 | 0.20 | 8 | 0.29 | 9 | 0.33 | 12 | 0.39 |
| 0.6 | 6 | 0.20 | 7 | 0.23 | 9 | 0.33 | 10 | 0.37 | 13 | 0.43 |
| 0.55 | 7 | 0.23 | 8 | 0.26 | 10 | 0.38 | 11 | 0.42 | 14 | 0.48 |
| 0.5 | 8 | 0.28 | | | 13 | 0.44 | | | 16 | 0.55 |
| 0.45 | 10 | 0.33 | | | 16 | 0.54 | | | | |
| 0.4 | 13 | 0.43 | | | 21 | 0.69 | | | | |
| 0.35 | 18 | 0.59 | | | 29 | 0.96 | | | | |
| 0.3 | 28 | 0.94 | | | 48 | 1.59 | | | | |
| 0.25 | 38 | 1.25 | | | 65 | 2.16 | | | | |
| 0.2 | 39 | 1.29 | | | 67 | 2.24 | | | | |
| 0.15 | | | | | | | | | | |
| 0.1 | | | | | | | | | | |
| 0.08 | | | | | | | | | | |
| 0.078 | | | | | | | | | | |
| 0.07 | | | | | | | | | | |

FIG.10A

| L (m) | Z6=17 | | Z7=20 | | Z8=21 | | Z9=23 | |
|---|---|---|---|---|---|---|---|---|
| | 1AF-STEP 0.029 AF STEP NUMBER (STEP) | 1 DV PERIOD 0.033333 AF SAMPLING TIME(S) | 1AF-STEP 0.029 AF STEP NUMBER (STEP) | 1 DV PERIOD 0.033333 AF SAMPLING TIME(S) | 1AF-STEP 0.029 AF STEP NUMBER (STEP) | 1 DV PERIOD 0.033333 AF SAMPLING TIME(S) | 1AF-STEP 0.029 AF STEP NUMBER (STEP) | 1 DV PERIOD 0.033333 AF SAMPLING TIME(S) |
| 100 | 0 | 0.00 | 0 | 0.00 | 0 | 0.01 | 0 | 0.01 |
| 50 | 0 | 0.01 | 0 | 0.01 | 0 | 0.01 | 0 | 0.01 |
| 30 | 0 | 0.01 | 1 | 0.02 | 1 | 0.02 | 1 | 0.02 |
| 20 | 1 | 0.02 | 1 | 0.02 | 1 | 0.03 | 1 | 0.03 |
| 15 | 1 | 0.02 | 1 | 0.03 | 1 | 0.04 | 1 | 0.04 |
| 12 | 1 | 0.03 | 2 | 0.04 | 2 | 0.05 | 2 | 0.05 |
| 10 | 1 | 0.03 | 2 | 0.05 | 2 | 0.06 | 2 | 0.06 |
| 8 | 2 | 0.04 | 2 | 0.06 | 3 | 0.07 | 3 | 0.08 |
| 7 | 2 | 0.05 | 3 | 0.07 | 3 | 0.08 | 3 | 0.09 |
| 6 | 2 | 0.06 | 3 | 0.08 | 3 | 0.09 | 4 | 0.10 |
| 5 | 3 | 0.07 | 3 | 0.10 | 4 | 0.11 | 4 | 0.13 |
| 4.5 | 3 | 0.07 | 4 | 0.11 | 4 | 0.12 | 4 | 0.14 |
| 4 | 3 | 0.08 | 4 | 0.12 | 5 | 0.14 | 5 | 0.16 |
| 3.5 | 4 | 0.10 | 5 | 0.14 | 5 | 0.16 | 5 | 0.18 |
| 3 | 4 | 0.11 | 5 | 0.16 | 6 | 0.19 | 6 | 0.21 |
| 2.5 | 5 | 0.13 | 6 | 0.20 | 7 | 0.22 | 7.62 | 0.25 |
| 2 | 6 | 0.17 | 7 | 0.25 | 8 | 0.28 | 10 | 0.32 |
| 1.8 | 6 | 0.19 | 8 | 0.27 | 9 | 0.31 | 11 | 0.36 |
| 1.7 | 7 | 0.20 | 9 | 0.29 | 10 | 0.33 | 11 | 0.38 |
| 1.5 | 8 | 0.23 | 10 | 0.33 | 11 | 0.38 | 13 | 0.43 |
| 1.3 | 9 | 0.26 | 11 | 0.38 | 13 | 0.44 | 15 | 0.50 |
| 1.2 | 9 | 0.29 | 12 | 0.42 | 14 | 0.48 | 16 | 0.54 |
| 1.1 | 10 | 0.31 | 14 | 0.46 | 16 | 0.52 | 18 | 0.59 |
| 1 | 10 | 0.34 | 15 | 0.50 | 17 | 0.57 | 20 | 0.65 |
| 0.9 | 12 | 0.38 | 17 | 0.56 | 19 | 0.64 | 22 | 0.73 |
| 0.8 | 13 | 0.43 | 19 | 0.64 | 22 | 0.73 | 25 | 0.83 |
| 0.7 | 15 | 0.50 | 22 | 0.73 | 25 | 0.84 | 29 | 0.95 |
| 0.6 | 18 | 0.59 | 26 | 0.86 | 30 | 0.99 | 34 | 1.13 |
| 0.55 | 19 | 0.65 | 28 | 0.95 | 33 | 1.09 | 37 | 1.24 |
| 0.5 | 21 | 0.71 | 32 | 1.05 | 36 | 1.21 | 41 | 1.38 |
| 0.45 | 24 | 0.80 | 35 | 1.18 | 41 | 1.36 | 46 | 1.55 |
| 0.4 | 27 | 0.91 | 40 | 1.35 | 46 | 1.55 | 53 | 1.77 |
| 0.35 | | | | | | | | |
| 0.3 | | | | | | | | |
| 0.25 | | | | | | | | |
| 0.2 | | | | | | | | |
| 0.15 | | | | | | | | |
| 0.1 | | | | | | | | |
| 0.08 | | | | | | | | |
| 0.078 | | | | | | | | |
| 0.07 | | | | | | | | |

| ZOOM POSITION | | NORMAL AREA | MACRO AREA | SUPER-MACRO AREA |
|---|---|---|---|---|
| WIDE | z1 | NO COARSE ADJUSTMENT | COARSE ADJUSTMENT | — |
| | z2 | NO COARSE ADJUSTMENT | NO COARSE ADJUSTMENT | — |
| | z3 | NO COARSE ADJUSTMENT | NO COARSE ADJUSTMENT | COARSE ADJUSTMENT |
| | z4 | NO COARSE ADJUSTMENT | NO COARSE ADJUSTMENT | — |
| MEAN | z5 | NO COARSE ADJUSTMENT | NO COARSE ADJUSTMENT | — |
| | z6 | NO COARSE ADJUSTMENT | COARSE ADJUSTMENT | — |
| | z7 | NO COARSE ADJUSTMENT | COARSE ADJUSTMENT | — |
| | z8 | NO COARSE ADJUSTMENT | COARSE ADJUSTMENT | — |
| TELE | z9 | NO COARSE ADJUSTMENT | COARSE ADJUSTMENT | — |

FIG.12

| ZOOM POSITION | | NORMAL AREA | MACRO AREA | SUPER-MACRO AREA |
|---|---|---|---|---|
| WIDE | z1 | NO COARSE ADJUSTMENT | COARSE ADJUSTMENT | — |
| | z2 | NO COARSE ADJUSTMENT | NO COARSE ADJUSTMENT | COARSE ADJUSTMENT |
| | z3 | NO COARSE ADJUSTMENT | NO COARSE ADJUSTMENT | — |
| | z4 | NO COARSE ADJUSTMENT | NO COARSE ADJUSTMENT | — |
| MEAN | z5 | NO COARSE ADJUSTMENT | NO COARSE ADJUSTMENT | — |
| | z6 | COARSE ADJUSTMENT | COARSE ADJUSTMENT | — |
| | z7 | COARSE ADJUSTMENT | COARSE ADJUSTMENT | — |
| | z8 | COARSE ADJUSTMENT | COARSE ADJUSTMENT | — |
| TELE | z9 | COARSE ADJUSTMENT | COARSE ADJUSTMENT | — |

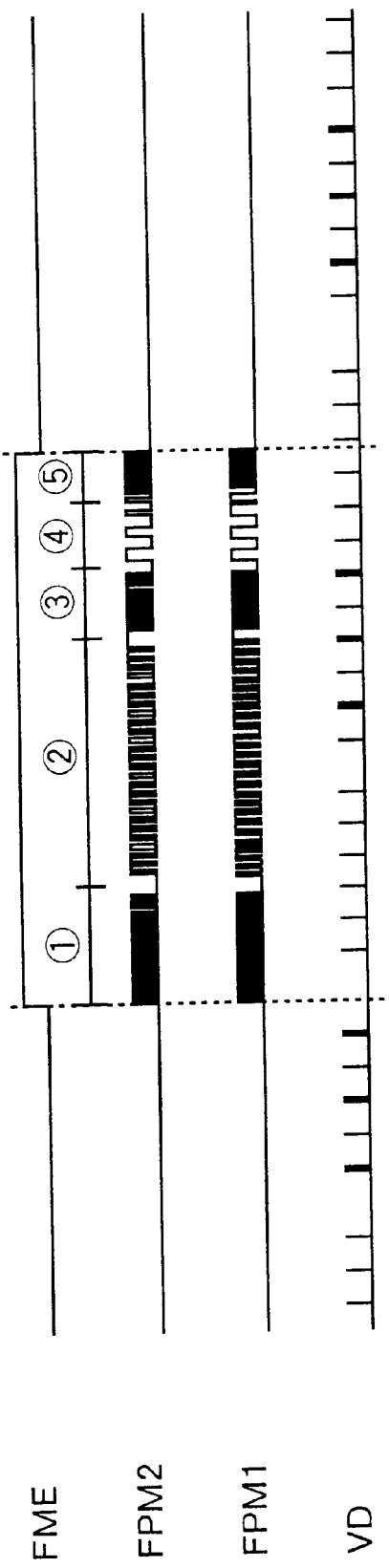

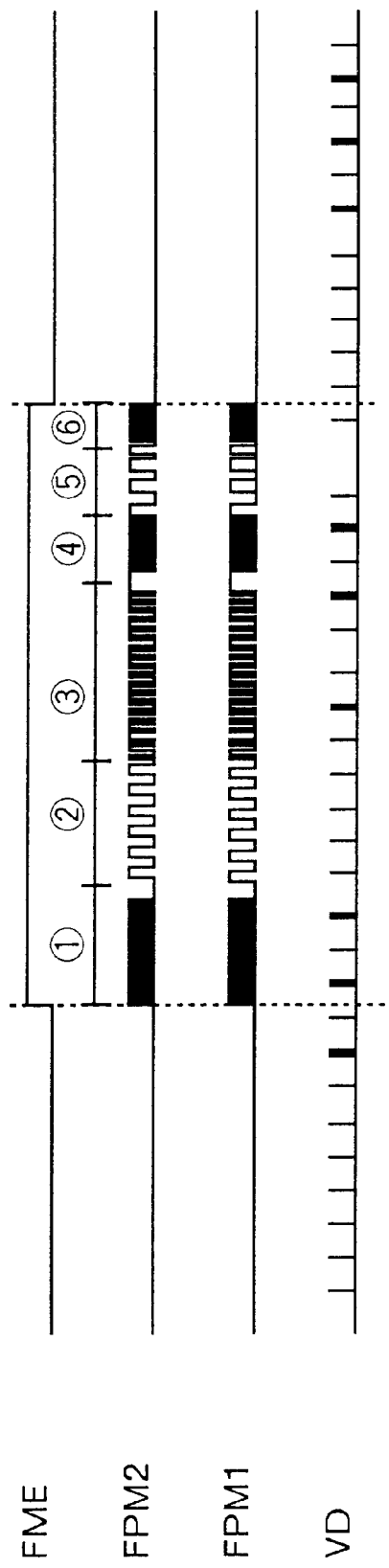

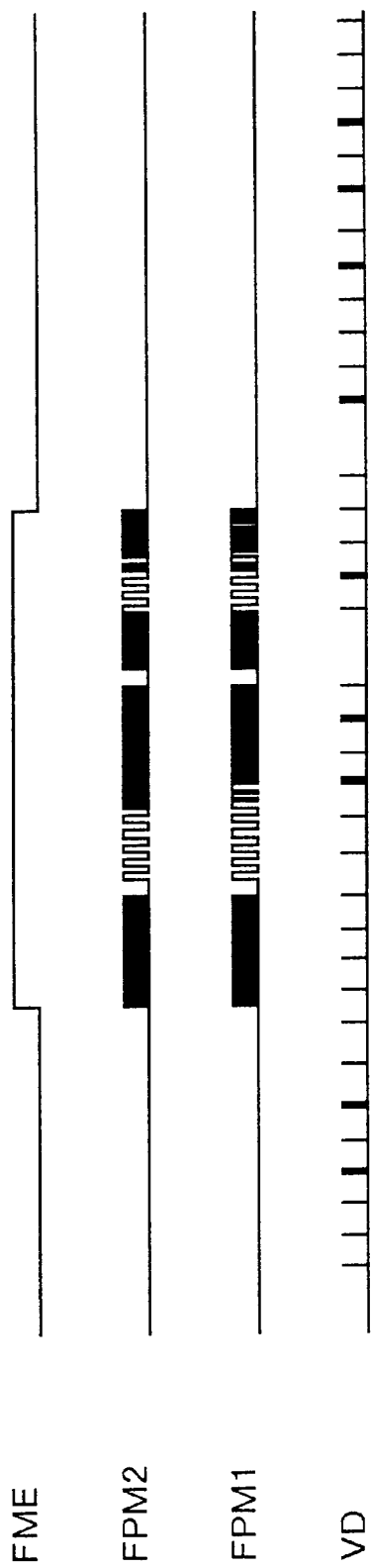

AUTOFOCUS APPARATUS

FIELD OF THE INVENTION

The present invention relates to an autofocus apparatus, and in particular, to an autofocus apparatus which is used for a digital camera, a digital video camera and the like.

BACKGROUND OF THE INVENTION

In an autofocus apparatus of a digital camera, a high frequency component of a video (image) signal from an image pickup device is used for an evaluation of focal control. The autofocus apparatus has the following excellent features; more specifically, there is substantially no existence of parallax, and in the case where a depth of field is shallow and a subject (object) is distant from a camera, it is possible to accurately focusing thereon. In addition, the autofocus apparatus requires no specific autofocus sensor, and has a very simple mechanism. Moreover, in the autofocus apparatus of a digital camera, in order to securely seize a shutter chance, there has been proposed a technique of shortening an AF run time.

For example, an autofocus camera disclosed in Japanese Patent Application Laid-Open No. 3-070273 detects a high-band component level of a video signal obtained from an image pickup device as a focus evaluation value every predetermined period, and thereby, performs an autofocus operation. Such an autofocus camera includes: search means; interpolation means; and focus evaluation value discrimination means. More specifically, the search means shifts (moves) a focus lens in a relatively coarse step from an infinity of subject distance to a closest focusing point, and thus, obtains a focus evaluation value for each step. The interpolation means makes an interpolation between a first maximum focus evaluation value obtained by the search means and a mutually adjacent focus evaluation value existing near to the first maximum focus evaluation value, and then, generates an interpolation focus evaluation value. The focus evaluation discriminating means discriminates a second maximum focus evaluation value from the interpolation focus evaluation value obtained by the interpolation means.

Moreover, an autofocus camera disclosed in Japanese Patent Application Laid-Open No. 3-068280 detects a high-band component level of a video signal obtained from an image pickup device as a focus evaluation value every predetermined period, and thereby, performs an autofocus operation. Such an autofocus camera includes: first search means; and second search means. More specifically, the first search means shifts (moves) a focus lens in a relatively coarse step from an infinity of subject distance to a closest focusing point, and thus, obtains a focus evaluation value for each step. The second search means shifts (moves) the focus lens to the vicinity of subject distance corresponding to a first maximum focus evaluation obtained by the first search means, and thereafter, shifts the focus lens in a fine step in the vicinity of the subject distance, and thus, obtains a second maximum focus evaluation value from a focus evaluation value for each fine step.

However, the aforesaid autofocus cameras disclosed in Japanese Patent Application Laid-Open No. 3-070273 and Japanese Patent Application Laid-Open No. 3-068280 have a problem that an AF running time becomes long depending upon the conditions. The following is a description on the cause of problem.

Usually, in AF of an electronic camera, first, a focus lens is shifted to infinity, and thereafter, an AF evaluation value is sampled while driving the focus lens to a near side, and thus, a peak of the AF evaluation value is obtained. In this case, when employing the methods disclosed in the aforesaid Japanese Patent Application Laid-Open No. 3-070273 and 3-068280 with respect to a subject near to the infinity, in order to obtain the peak 1 of the AF focus evaluation value of a relatively coarse step, the focus lens is driven to the near side from an in-focus position, and thereafter, the AF evaluation value in a fine step is sampled. Further, the focus lens is driven to the infinity side from the peak 1, and thereafter, a peak 2 of the AF evaluation value is obtained. For this reason, the focus lens is driven to the near side from the in-focus position so as to obtain the in-focus position, and thereafter, the focus lens is driven to the in-focus position.

Moreover, when employing the methods disclosed in the aforesaid Japanese Patent Application Laid-Open No. 3-070273 and 3-068280 with respect to a subject near to the infinity, the AF evaluation value is sampled from a focus infinity position; nevertheless, in two-time AF evaluation value sampling of relatively coarse step and fine step, as a focus lens operation, there are many return operations for the fine step AF evaluation value sampling. As seen from the above description, according to the technique disclosed in the aforesaid Japanese Patent Application Laid-Open No. 3-070273 and 3-068280, the AF running time is not always shortened.

Usually, in order to obtain a peak, at least three sampling AF evaluation values are required; for this reason, in the aforesaid two-time AF evaluation samplings, at least six sampling AF evaluation values are required. In the case where an in-focus position is obtained in six time or less AF evaluation value samplings, the AF running time can not be shortened even if there is no factor described above.

In general, a peak detection from three sampling AF evaluation values is not made because there is a noise, a pseudo peak or the like. Moreover, when the sampling number of AF evaluation values required for detecting a peak becomes much, there are many cases where the AF running time is not shortened.

SUMMARY OF THE INVENTION

It is an object of the present invention to provide an autofocus apparatus which shortens a time of driving a focus lens to an in-focus position so as to achieve a reduction of AF running time.

In order to solve the above problem, according to a first aspect, the present invention provides an autofocus apparatus comprising: an image pickup device for converting a subject light via a lens system into an electric signal, and for outputting the electric signal as an image data; A/D conversion means for A/D-converting the image data into a digital image signal; AF evaluation means for outputting an AF evaluation value on the basis of a high frequency component of a luminance signal of the digital image data; sampling means for sampling the AF evaluation value obtained by the AF evaluation means while shifting a focus lens position; and focus driving means for detecting an in-focus position on the basis of the AF evaluation value sampling result obtained by the sampling means, the autofocus apparatus further having: a first mode of shifting the focus lens at a fine step interval so as to sample an AF evaluation value, and for detecting an in-focus position on the basis of a sampling AF evaluation value; and a second mode of shifting the focus lens at a coarse step interval so as to sample an AF evaluation value, and detecting a rough in-focus position on the basis of the sampling AF evaluation value, and subsequently, shifting the focus lens at a fine step interval so as to sample an AF evaluation value in the vicinity of the rough in-focus position, and detecting an in-focus position on the basis of the sampling AF evaluation value, the autofocus apparatus being capable of selecting the first mode and the second mode.

Further, according to a second aspect, the present invention provides an autofocus apparatus comprising: an image pickup device for converting a subject light via a lens system into an electric signal, and for outputting the electric signal as an image data; A/D conversion means for A/D-converting the image data into a digital image signal; AF evaluation means for outputting an AF evaluation value on the basis of a high frequency component of a luminance signal of the digital image data; sampling means for sampling the AF evaluation value obtained by the AF evaluation means while shifting a focus lens position; focus driving means for detecting an in-focus position on the basis of the AF evaluation value sampling result obtained by the sampling means, and setting means for setting a plurality of focus lens shifting ranges for sampling the AF evaluation value, and for setting a sequence of detecting an in-focus position in each set shifting range, the autofocus apparatus detecting an in-focus position in each shifting range according to the sequence set by the setting means.

Further, according to a third aspect, the present invention provides an autofocus apparatus comprising: an image pickup device for converting a subject light via a lens system into an electric signal, and for outputting the electric signal as an image data; A/D conversion means for A/D-converting the image data into a digital image signal; AF evaluation means for outputting an AF evaluation value on the basis of a high frequency component of a luminance signal of the digital image data; sampling means for sampling the AF evaluation value obtained by the AF evaluation means while shifting a focus lens position; focus driving means for detecting an in-focus position on the basis of the AF evaluation value sampling result obtained by the sampling means, and setting means for setting a plurality of focus lens shifting ranges for sampling the AF evaluation value, and for setting a sequence of detecting an in-focus position in each set shifting range, the autofocus apparatus further having: a first mode of shifting the focus lens at a fine step interval so as to sample an AF evaluation value, and for detecting an in-focus position on the basis of a sampling AF evaluation value; and a second mode of shifting the focus lens at a coarse step interval so as to sample an AF evaluation value, and detecting a rough in-focus position on the basis of the sampling AF evaluation value, and subsequently, shifting the focus lens at a fine step interval so as to sample an AF evaluation value in the vicinity of the rough in-focus position, and detecting an in-focus position on the basis of the sampling AF evaluation value, the autofocus apparatus being capable of selecting the first mode and the second mode for each shifting range set by the setting means, and detecting an in-focus position in each shifting range according to the sequence set by the setting means.

Further, according to a fourth aspect, the present invention provides the autofocus apparatus wherein the autofocus apparatus automatically selects the first mode and the second mode.

Further, according to a fifth aspect, the present invention provides the autofocus apparatus wherein the autofocus apparatus automatically selects the first mode and the second mode in accordance with a focal length.

Further, according to a sixth aspect, the present invention provides the autofocus apparatus wherein the autofocus apparatus automatically selects the first mode and the second mode in accordance with a recording pixel aspect ratio.

Further, according to a seventh aspect, the present invention provides the autofocus apparatus wherein the autofocus apparatus automatically selects the first mode and the second mode in accordance with an F-number.

Other objects and features of this invention will become understood from the following description with reference to the accompanying drawings.

BRIEF DESCRIPTION OF THE DRAWINGS

FIG. 3 is a view to explain a logic value of each pulse motor driver of FIG. 2;

FIG. 6 is a view showing a relation between a driving pulse number of pulse motor for driving a focus lens and 1 AF step;

FIGS. 10A and 10B are views to explain sampling concept of a normal area and a macro area;

FIG. 11 is a view showing a setup example of coarse adjustment/no coarse adjustment in each zoom position and camera-to-subject distance (normal area, macro area, super-macro area) in the case where a setting pixel aspect ratio is 1800×1200 pixels;

FIG. 12 is a view showing a setup example of coarse adjustment/no coarse adjustment in each zoom position and camera-to-subject distance (normal area, macro area, super-macro area) in the case where a setting pixel aspect ratio is 900×600;

FIG. 13 is a timing chart of the case where a coarse adjustment is made in a macro area and a normal area in the case where a setting pixel aspect ratio is 1800×1200 pixels;

FIG. 14 is a timing chart of the case where a coarse adjustment is made in a macro area and no coarse adjustment is made in a normal area in the case where a setting pixel aspect ratio is 1800×1200 pixels;

FIG. 16 is a timing chart of the case where a coarse adjustment is made in a macro area and no coarse adjustment is made in a normal area in the case where a setting pixel aspect ratio is 900×600 pixels.

DESCRIPTION OF THE PREFERRED EMBODIMENTS

A preferred embodiment of an autofocus apparatus according to the present invention will be detailedly described below with reference to the accompanying drawings.

Figure 1:
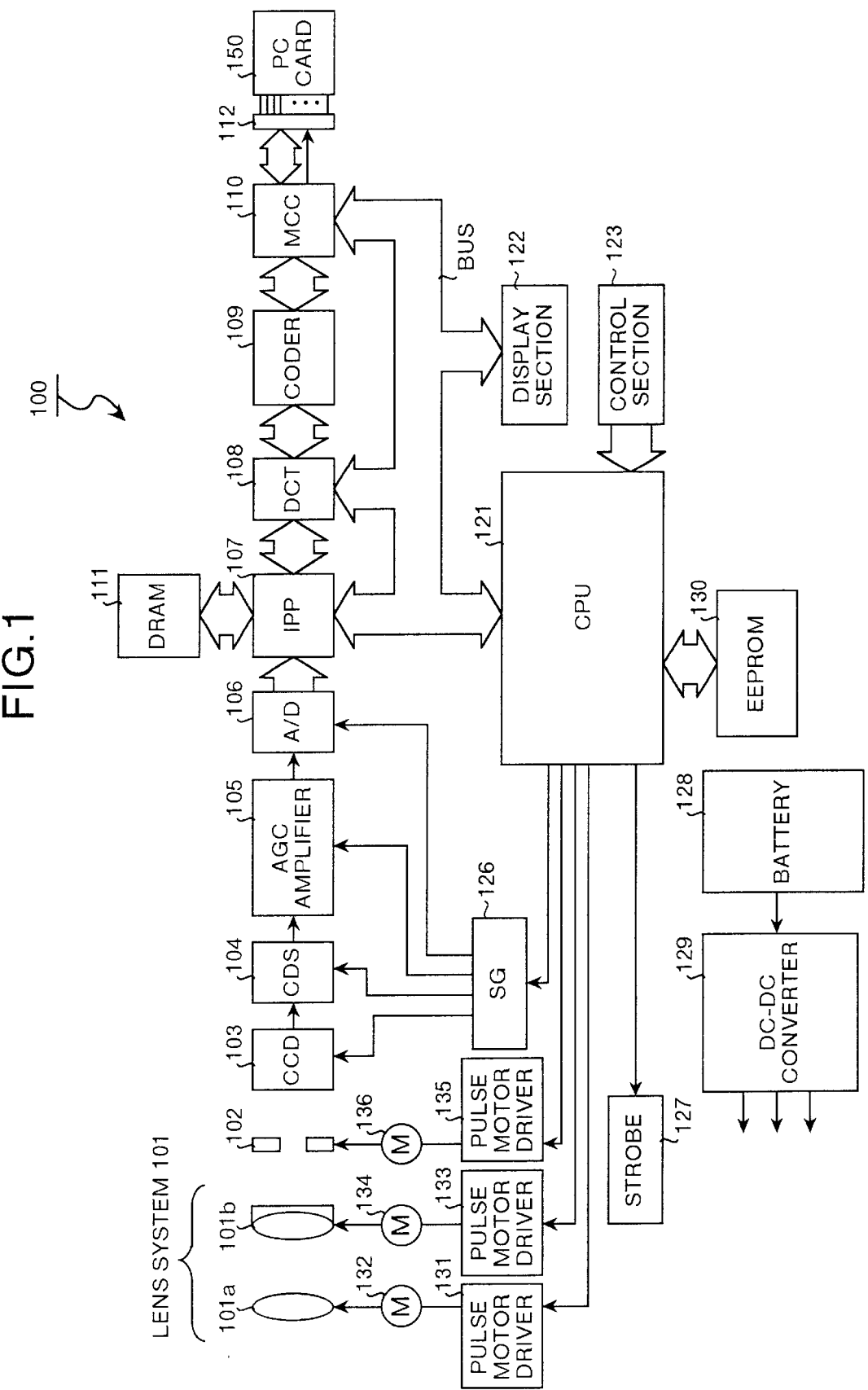
FIG. 1 is a block diagram showing a construction of a digital camera according to one embodiment of the present invention.

FIG. 1 is a view showing a construction of a digital camera to which an autofocus apparatus according to this embodiment is applied. In FIG. 1, a reference numeral 100 denotes a digital camera. The digital camera 100 includes a lens system 101, a mechanism 102 including a diaphragm (aperture), a mechanical shutter and the like, a CCD 103, a CDS circuit 104, a variable gain amplifier (AGC amplifier) 105, an A/D converter 106, an IPP 107, a DCT 108, a coder 109, an MCC 110, a DRAM 111, a PC card interface 112, a CPU 121, a display section 122, a control section 123, an SG (control signal generating) section 126, a strobe device 127, a battery 128, a DC-DC converter 129, an EEPROM 130, a pulse motor driver 131, a pulse motor 132, a pulse motor driver 133, a pulse motor 134, a pulse motor driver 135, and a pulse motor 136. In FIG. 1, BUS denotes a bus. Moreover, the digital camera is connectable with a removable PC card 150 via the PC card interface 112.

A lens unit is composed of the lens system 101 and the mechanism 102 including the diaphragm, a mechanical shutter and the like. The lens system 101 comprises a variable focus (vari-focal) lens, and is composed of a focus lens 101a and a zoom lens 101b.

The pulse motor driver 131 drives the pulse motor 132 according to a control signal supplied from the CPU 121 so as to shift (move) the focus lens 101a to an optical axis direction. The pulse motor driver 133 drives the pulse motor 134 according to a control signal supplied from the CPU 121 so as to shift the zoom lens 101b to an optical axis direction. The pulse motor driver 135 drives the diaphragm (aperture) and the mechanical shutter according to a control signal supplied from the CPU 121.

The CCD (Charge Coupled Device) 103 converts a video (image) inputted via the lens unit into an electric signal (analog image data). The CDS (Correlation Double Sampling) circuit 104 is a circuit for reducing a noise with respect to a CCD type image pickup device.

The AGC amplifier 105 corrects a level of the correlation double sampling signal from the CDS 104. In this case, a gain of the AGC amplifier 105 is set by the CPU 121 when a setting data (control voltage) is set in the AGC amplifier 105 via the D/A converter built in the CPU 121. Further, the A/D converter 106 converts the analog image data from the CCD 103 inputted via the AGC amplifier 105 into a digital image data. More specifically, an output signal of the CCD 103 is converted into a digital signal by the A/D converter 106 via the CDS circuit 104 and the AGC amplifier 105 at an optimum sampling frequency (e.g., an integer time of sub-carrier frequency of NTSC signal).

The IPP (Image Pre-Processor) 107 which is a digital signal processor, the DCT (Discrete Cosine Transformer) 108 and the coder (Huffman Encoder/Decoder) 109, divides the digital image data inputted from the A/D converter 106 into a color difference signal (Cb, Cr) and a luminance signal (Y), and then, executes data processings for various processings, correction and image compression/elongation. Further, the above IPP (Image Pre-processor) 107 extracts a high frequency component of the luminance signal (Y) of the inputted image data, and then, calculates an AE evaluation value so as to output it to the CPU 121. Furthermore, the IPP 107 generates a video signal on the basis of the color difference signal (Cb, Cr) and the luminance signal (Y), and then, outputs the video signal to the display section 122. The above DCT 108 and the coder (Huffman Encoder/Decoder) executes an orthogonal transformation which is one process of image compression/enlargement (elongation) conformed to JPEG, and executes Huffman coding/decoding which is one process of image compression/enlargement conformed to JPEG.

The MCC (Memory Card Controller) 110 temporarily stores the compressed image, and then, executes recording to the PC card 150 or reading from the PC card 150 via the PC card interface 112.

The CPU 121 uses a RAM as a work area according to a program stored in the ROM, and then, controls the whole internal operations of the above digital camera according to an instruction from the control section 123, or an external operating instruction by a remote control (not shown) or the like. More specifically, the CPU 121 executes the following controls for a shooting operation, an AF operation, an automatic exposure (AE) operation, an automatic white balance (AWB) adjustment operation and the like.

A camera power is inputted to the DC-DC converter 129 from the battery 128, for example, NiCd, nickel hydrogen, lithium battery or the like, and then, is supplied to the digital camera.

The display section 122 is realized by a LCD, a LED, an EL or the like, and displays a taken (shot) digital image data, an enlarged recording image data or the like. Further, the display section 122 displays various setup screens such as an AF condition setup screen for setting an AF condition, a setup screen for setting a super-macro mode. A user operates the control section 123 so as to display various setup screens.

In the above AF condition setup screen, it is possible to select a manual setup mode of executing an AF operation according to an AF condition set by the user, and an automatic setup mode of executing an AF operation according to an automatically set AF condition. In the case where the user selects the manual setup mode, the setup mode sets a shift range between a normal area and a macro area, which is a shift range (camera-to-subject distance) of the focus lens 101a, and sets a sequence of AF evaluation value sampling in the set shift range, and further, sets coarse adjustment (second mode)/no coarse adjustment (first mode) in each of the normal area and the macro area.

The user sets a shift range of the focus lens 101a between the normal area and the macro area, and further, when setting the sequence of AF evaluation value sampling in the normal area and the macro area of the set shift range, according to the set sequence, an in-focus position is detected. In the case where no in-focus position is found (detected), the in-focus position is detected in a shift range set by the next sequence.

In the case where coarse adjustment is selected, the focus lens 101a is shifted, and then, an AF evaluation value is sampled at a fine step interval (e.g., 1 AF step), and further, a peak position is detected from a plurality of AF evaluation values thus sampled so as to detect an in-focus position. On the other hand, in the case where no coarse adjustment is selected, the focus lens 101a is shifted, and then, an AF evaluation value is sampled at a coarse step interval, and further, a peak position is detected from a plurality of AF evaluation values thus sampled so as to detect a roughly in-focus position. Next, in the vicinity of the roughly in-focus position, the focus lens 101a is shifted, and then, an AF evaluation value is sampled at a fine step interval, and further, a peak position is detected from a plurality of AF evaluation values thus sampled so as to detect a final in-focus position.

In the case where the automatic setup mode is selected, coarse adjustment (second mode)/no coarse adjustment (first mode) is automatically set up in each of the normal area and the macro area in accordance with a camera-to-subject distance, a focal length, a setting pixel aspect ratio and an aperture (diaphragm) value.

The control section 123 includes a function select button, a shooting instruction button, a button for executing various setups on the setup screen of the display section 122, an image quality select key for selecting a recording image quality, etc. In the case where a high image quality mode is selected by the image quality select key, a recording pixel aspect ratio of the CCD is set to 1800×1200 pixels; on the other hand, in the case where a normal image quality is selected, the recording pixel aspect ratio of the CCD is set to 900×600 pixels. Moreover, an adjustment data used when the CPU 121 controls an operation of the digital camera is written in the EEPROM 130.

The above digital camera 100 (CPU 121) includes a recording mode for recording an image data obtained by picking up a subject in the PC card 150, a display mode for displaying the image data recorded in the PC card 150, and a monitoring mode for directly displaying the picked up image data on the display section 122.

Figure 2:
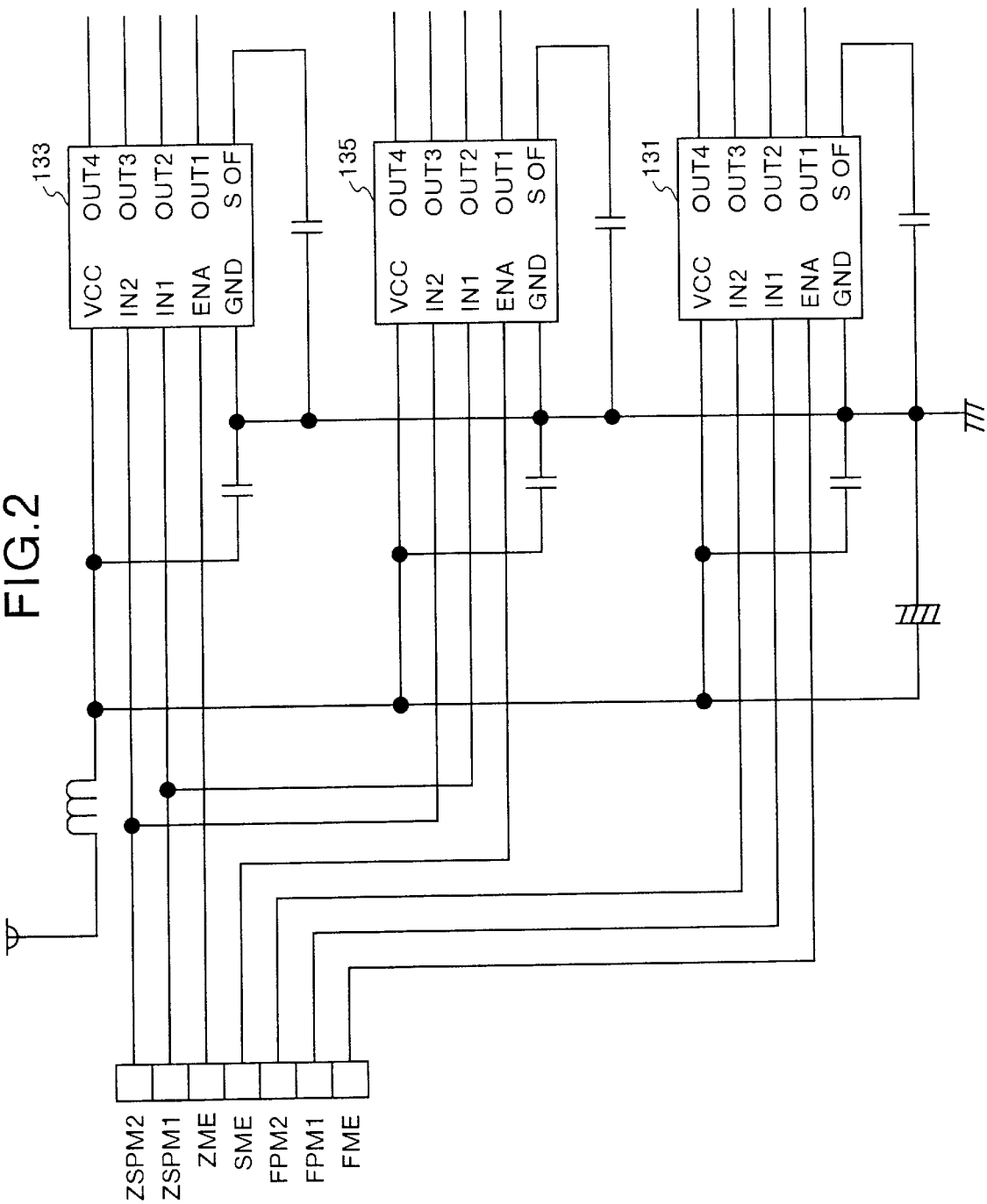
FIG. 2 is a circuit diagram showing each pulse motor driver shown in FIG. 1.
Figure 4:
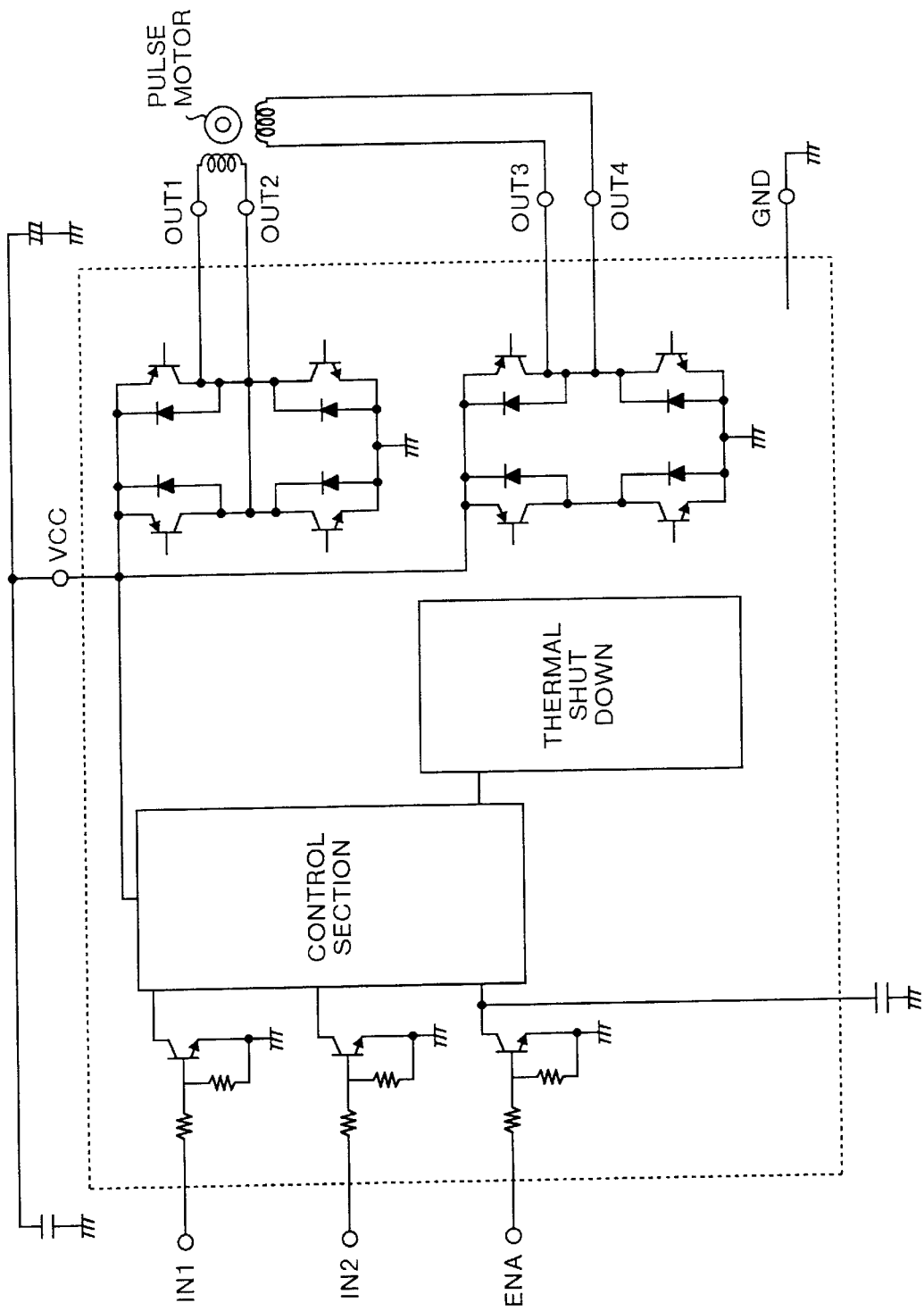
FIG. 4 is a view to explain an operation concept of each pulse motor driver of FIG. 2.

Next, the following is a detailed description on the pulse motor drivers 131, 133 and 135. FIG. 2 is a circuit diagram of each pulse motor driver, FIG. 3 is a table showing a logic value of each pulse motor driver, and FIG. 4 is a view showing an operation concept of the pulse motor driver. Each pulse motor driver has an input/output relation according to the logic value table shown in FIG. 3.

According to the logic value table shown in FIG. 3, each of the pulse motor drivers 131, 133 and 135 has no input (IN1, 2) in the case where an enable signal of the circuit is "L" (low), and is in a waiting state; therefore, output (OUT1, 2, 3, 4) becomes an off state. On the other hand, in the case where the enable signal is "H" (high), from the logic relation between the input IN1 and IN2, the outputs OUT1 to OUT4 are an output for generating a two-phase excitation change of the pulse motor.

Next, the following is a description on a control for the lens system 101. As described before, the lens system 101 is a vari-focal lens, and has different in-focus position of the focus lens 101a depending upon each focal length position.

Figure 5:
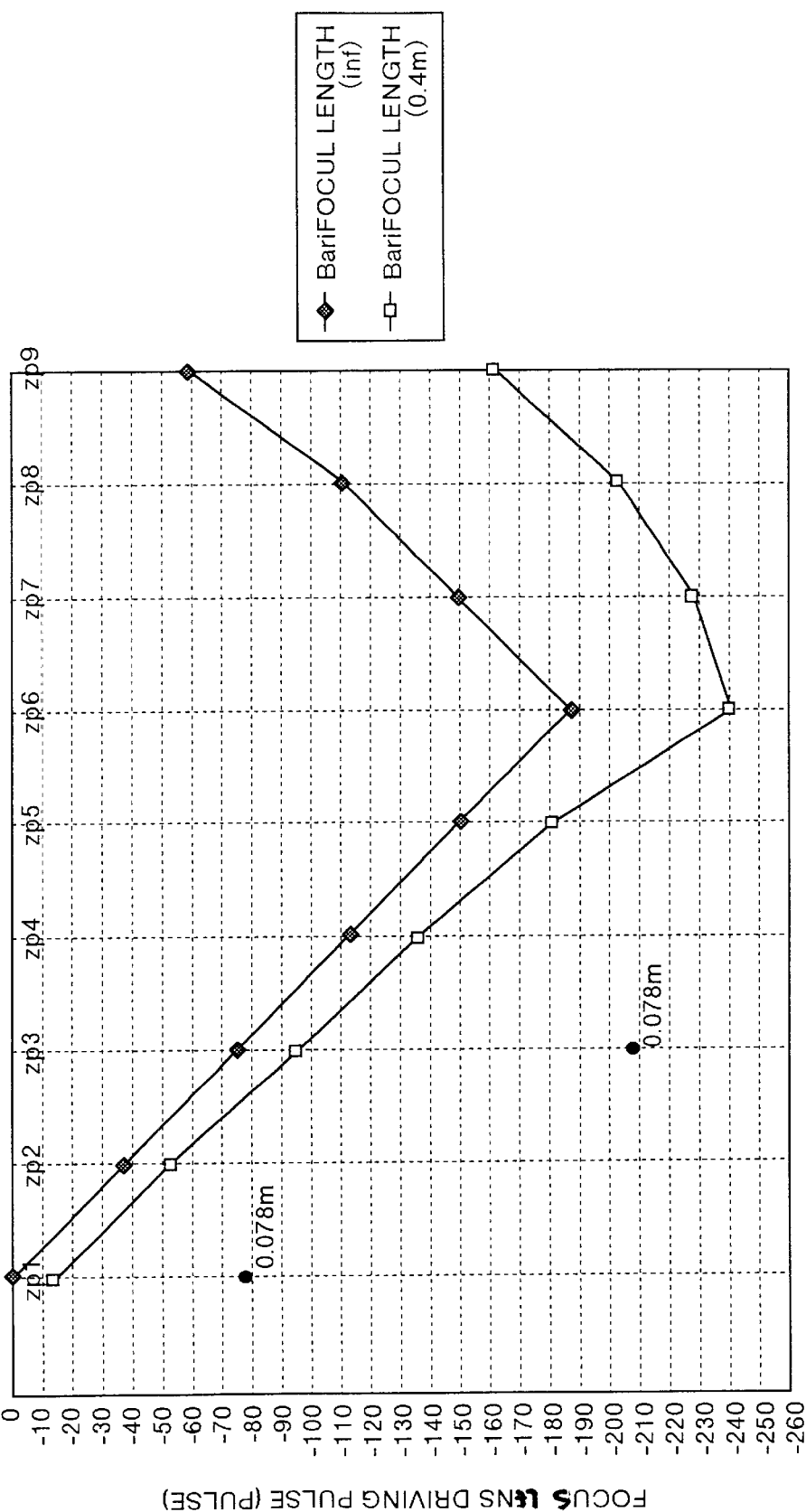
FIG. 5 is a graph showing a relation between each focal length (zoom) position and a driving pulse of pulse motor for driving a focus lens in each camera-to-subject distance.

FIG. 5 is a graph showing a relation between each of focal length (zoom) positions zp1 to zp9 and a driving pulse of the pulse motor 131 for driving the focus lens 101a in each camera-to-subject distance (infinity: 0.4 m, 0.078 m). In FIG. 5, the vertical axis (ordinate) takes a driving pulse number of the pulse motor 132 for driving the focus lens 101a, and the horizontal axis (abscissa) takes a focal length (zoom) position.

As seen from the graph of FIG. 5, only in the case where the focal length (zoom) position is zp1 and zp3, an in-focus up to 0.078 m is possible. More specifically, in the case where the focal length (zoom) position is zp1, a camera-to-subject distance is set so that the in-focus is continuously possible in a range from infinity to 0.078 m. Moreover, in the case where the focal length (zoom) position is zp3, when the in-focus is continuously made in a camera-to-subject distance from infinity to 0.078 m, the pulse number increases. For this reason, considering an AF running time, only in the case where a super-macro mode is set, an in-focus range from 0.4 m to 0.078 m is set; on the other hand, in the case where the super-macro mode is not set, an in-focus range from infinity to 0.4 m is set.

FIG. 6 is a table showing a relation between a driving pulse number of the pulse motor 132 for driving the focus lens 101a and 1 AF step. In the case where the setting pixel aspect ratio of the CCD 103 is 1800×1200 pixels, the driving pulse number is set to 2 pulses in the case of a fine adjustment, and is set to 6 pulses (three times of the fine adjustment) in the case of a coarse adjustment. Moreover, in the case where the setting pixel aspect ratio of the CCD 103 is 900×600 pixels, the driving pulse number is set to 3 pulses in the case of a fine adjustment, and is set to 9 pulses (three times of the fine adjustment) in the case of a coarse adjustment.

Next, the following is a description on a method for determining an in-focus position. The in-focus position is detected on the basis of an AF evaluation value. The IPP 107 extracts a high frequency component from a luminance signal by using a filter A (seventh band-pass filter) and a filter B (tertiary band-pass filter), and then, outputs the high frequency component to the CPU 121 as an AF evaluation value. More specifically, the CPU 121 samples the AF evaluation value while driving the focus lens 101a for each arbitrary shift rate, and then, finds a position (in-focus peak) having the maximum value of the AF evaluation value, and thus, determines the in-focus peak as an in-focus position. Then, the CPU 121 shifts the focus lens 101a to the in-focus position thus determined.

Figure 7:
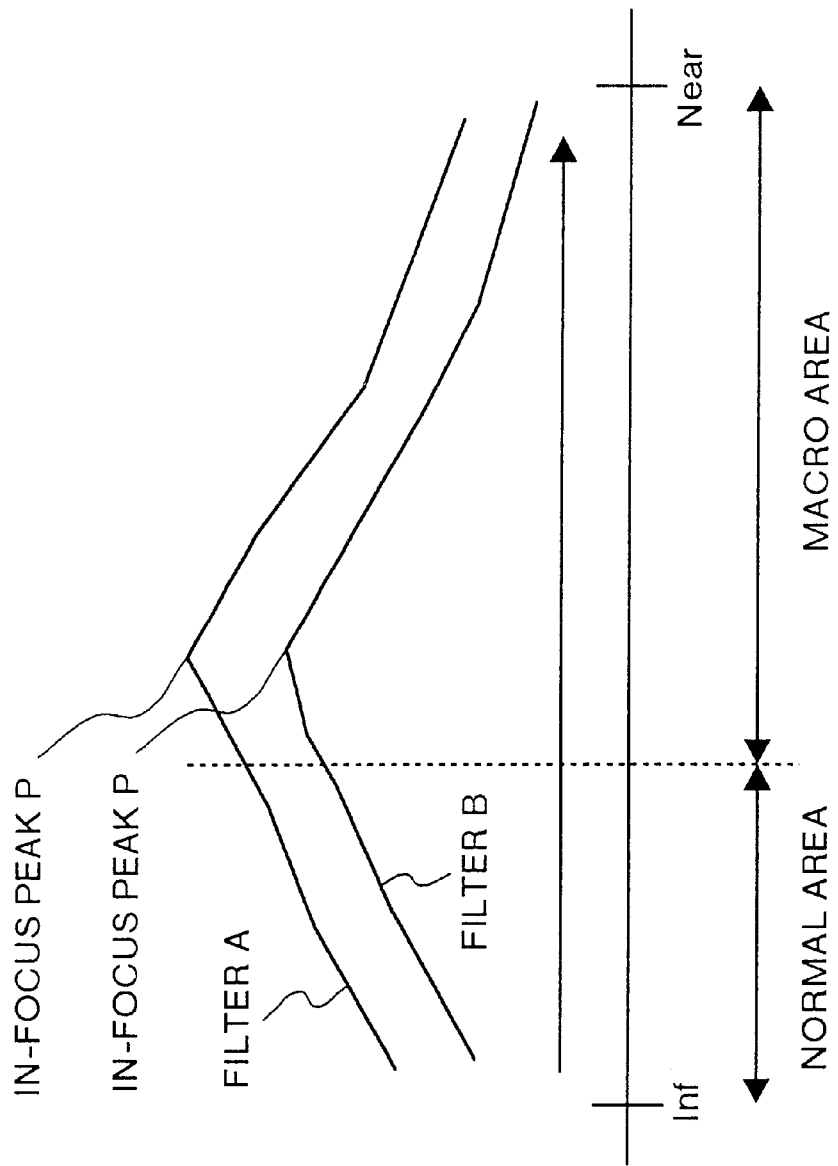
FIG. 7 is a view showing a relation between an AF evaluation value and an in-focus peak.

The relation between the AF evaluation value and the in-focus position will be described below with reference to FIG. 7. FIG. 7 is a graph showing a relation an AF evaluation value and an in-focus peak. In the graph of FIG. 7, the horizontal axis (abscissa) takes a camera-to-subject distance (from near to infinity), and the vertical axis (ordinate) takes an AF evaluation value by the filters A and B from near to infinity. In the graph of FIG. 7, a peak position P of the AF evaluation value is an in-focus position (in-focus peak).

Figure 8:
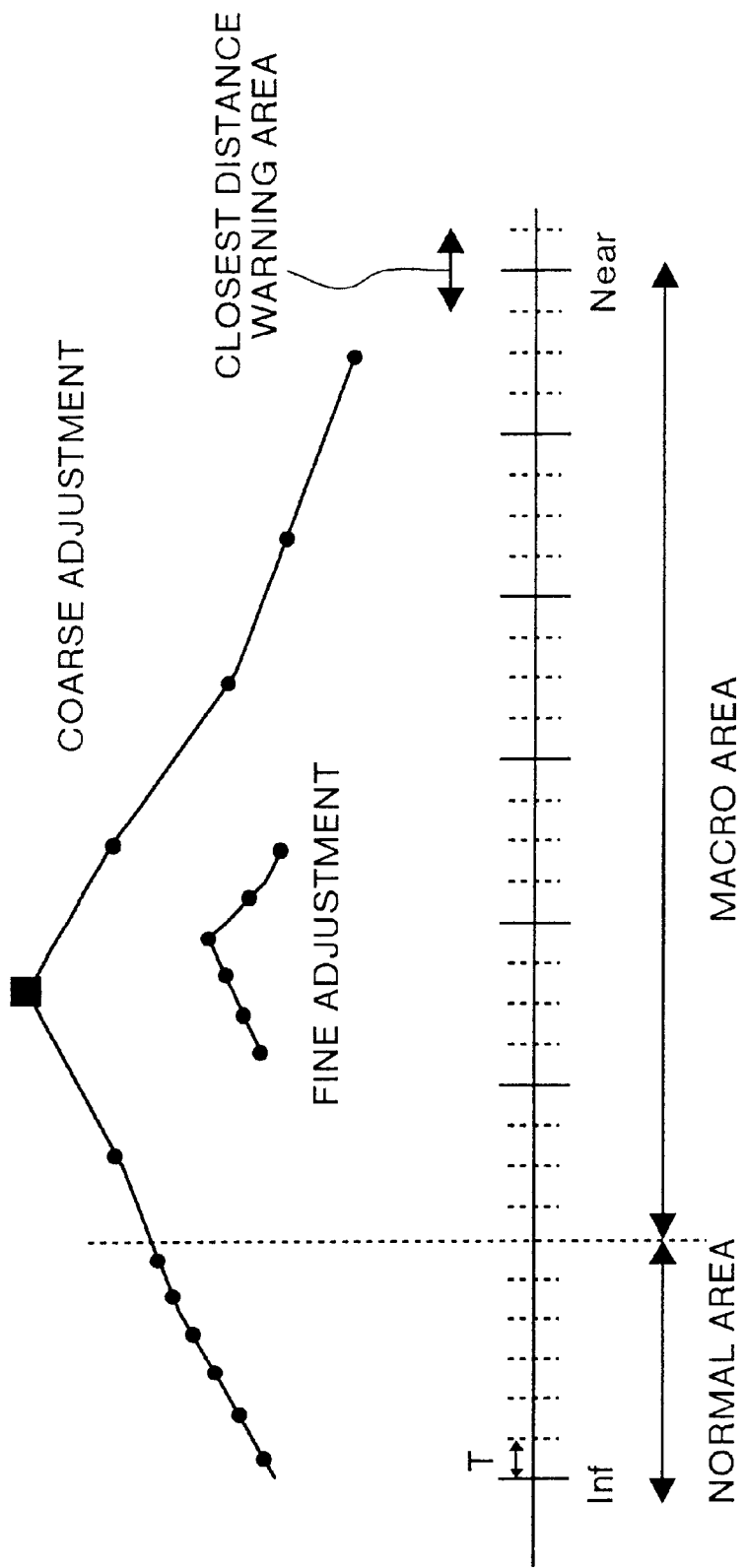
FIG. 8 is a view to explain a coarse adjustment and a fine adjustment.

A coarse adjustment and a fine adjustment will be described below with reference to FIG. 8. FIG. 8 is a graph to explain the coarse adjustment and the fine adjustment. In the graph of FIG. 8, the horizontal axis takes a camera-to-subject distance (from near to infinity), and the vertical axis (ordinate) takes an AF evaluation value of the coarse adjustment and the fine adjustment from near to infinity. Moreover, in FIG. 8, T denotes 1 AF step. In this embodiment, as described above, in the case of detecting an in-focus position, there are the case where no coarse adjustment is made, and the case where the coarse adjustment is made. In the case where no coarse adjustment is made, an AF evaluation value is sampled at 1 AF step interval so as to determine an in-focus position. Moreover, in the case where the coarse adjustment is made, an AF evaluation value is sampled at a sampling period greater than the case of the fine adjustment, and then, a roughly in-focus position is detected. Then, in the vicinity of the roughly in-focus position, an AF evaluation value is sampled at 1 AF step interval, and thus, a final in-focus position is determined. Namely, the case of making the coarse adjustment has two steps, that is, coarse adjustment and fine adjustment.

Figure 9:
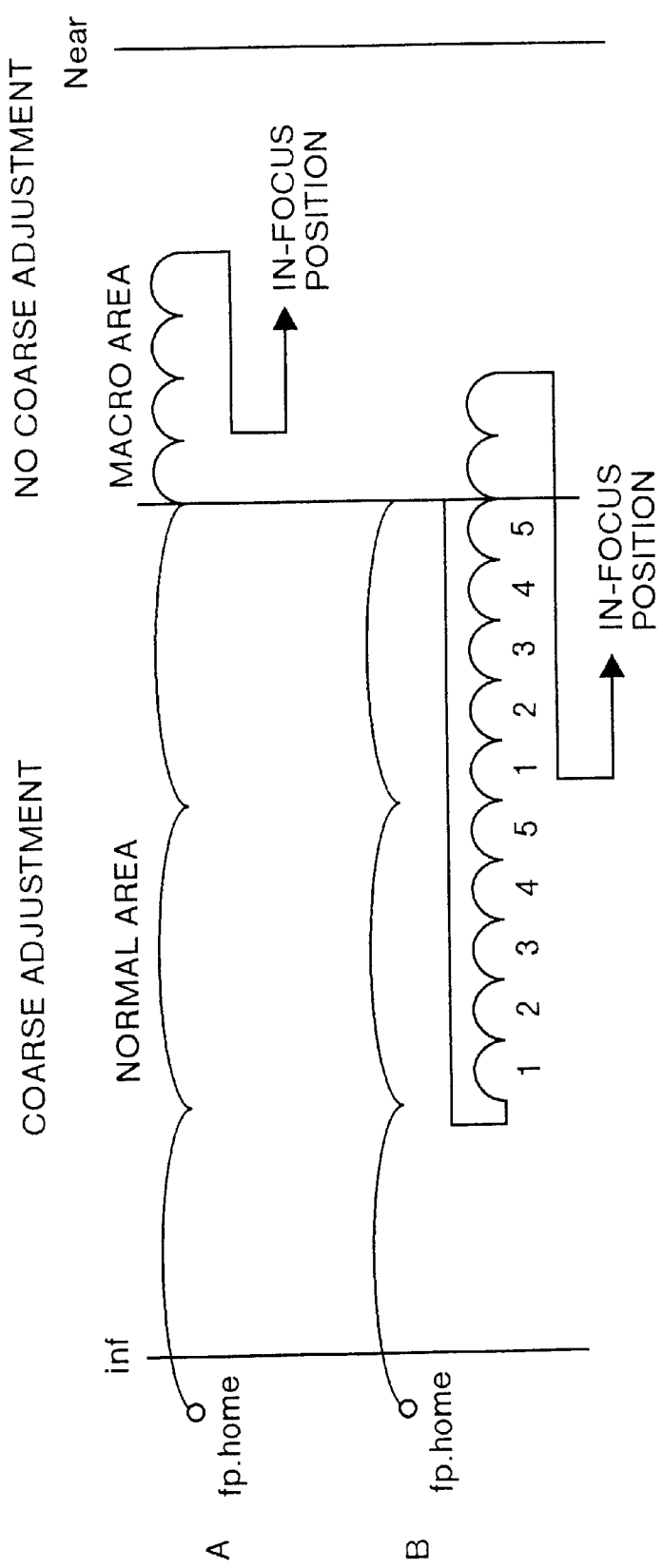
FIG. 9 is a view showing one example of a relation between a camera-to-subject distance L, an AF step number and an AF sampling time in each zoom position.

Subsequently, a normal area and a macro area will be described below with reference to FIG. 9. FIG. 9 is a view to explain a sampling concept of the normal area and the macro area. FIG. 9 shows the case where a coarse adjustment is made in the normal area and no coarse adjustment is made in the macro area. Moreover, in FIG. 9, A denotes a sampling locus of the case where an in-focus position exists in the macro area, and B denotes a sampling locus of the case where an in-focus position exists in the normal area.

In the normal area, as shown by B, even if an in-focus peak is detected during AF evaluation value sampling, the AF evaluation value sampling is always carried out over the whole areas of the AF step number in each zoom point. Moreover, in the macro area, as shown by A, even if an in-focus peak is detected during AF evaluation value sampling, the sampling is completed in the middle of sampling. The above process is carried out in order to reduce a time although the AF evaluation values of the whole areas are sampled, and thereby, it is easy to prevent a pseudo in-focus (pseudo peak). In the example shown in FIG. 9, the in-focus position is detected in the sequence from the normal area to the macro area. As described before, the in-focus position may be detected in the reverse sequence by user's select.

FIGS. 10A and 10B are views showing relation between a camera-to-subject distance L, an AF step number and an AF sampling time in each of zoom positions (z1 to z9). In a closest focusing distance side, the AF step number and the AF sampling time becomes large.

Next, the following is a description on the case (automatic setup mode) of changing the setting of coarse adjustment/no coarse adjustment in a normal area, a macro area and a super-macro area in accordance with a setting pixel aspect ratio. The above automatic setup mode will be described below with reference to FIG. 11 and FIG. 12.

FIG. 11 shows a setting example of each zoom position (z1 to z9) and coarse adjustment/no coarse adjustment in a camera-to-subject distance (normal area, macro area, super-macro area) in the case where the setting pixel aspect ratio is 1800 ×1200 pixels. FIG. 12 shows a setting example of each zoom position (z1 to z9) and coarse adjustment/no coarse adjustment in a camera-to-subject distance (normal area, macro area, super-macro area) in the case where the setting pixel aspect ratio is 900×600 pixels. In FIG. 11 and FIG. 12, a camera-to-subject distance from 1 m to infinity is set as a normal area, and a distance near from 1 m is set as a macro area. As seen from FIG. 11 and FIG. 12, in the macro area, the setting of coarse adjustment/no coarse adjustment is the same in the case where the setting pixel aspect ratio is 1800×1200 pixels and in the case where the setting pixel aspect ratio is 900×600 pixels. On the other hand, in the normal area, when the zoom position ranges from z6 to z9, the setting pixel aspect ratio is 1800×1200 pixels, the coarse adjustment is made, and in the case where the setting pixel aspect ratio is 900×600 pixels, no coarse adjustment is made. Under the condition (normal area, zoom positions of z6 to z9), in the case where the setting pixel aspect ratio is 1800×1200 pixels, the coarse adjustment is made, and thereby, it is possible to reduce an AF running time.

Next, an in-focus operation timing will be described below with reference to FIG. 13 to FIG. 16. FIG. 13 to FIG. 16 individually show an in-focus operation timing of the case where the zoom position is z9 (tele) and a camera-to-subject distance is 0.4 m (closet distance). In FIG. 13 to FIG. 16, FME denotes an enable signal of the pulse motor driver 131, FPM1 and FPM2 denote a driving pulse of the pulse motor 132, and VD denotes a vertical synchronizing signal.

First, the following is a description on the case where the setting pixel aspect ratio is 1800×1200 pixels. FIG. 13 is a timing chart in the case where the setting pixel aspect ratio is 1800×1200 pixels, and in the case where a coarse adjustment is made in the macro area and the normal area, and FIG. 14 is a timing chart in the case where the setting pixel aspect ratio is 1800×1200 pixels, and in the case where a coarse adjustment is made in the macro area and no coarse adjustment is made in the normal area.

In FIG. 13, in an interval (1), the focus lens 101a is shifted from the closest focusing position to the infinity position in order to carry out AF evaluation value sampling. In an interval (2), the focus lens 101a is shifted at 3 AF step (coarse adjustment) per 1 VD (1/30 second), and simultaneously, in the normal area and the macro area, coarse adjustment AF evaluation value sampling is carried out so as to detect an in-focus peak (in the normal area, no peak exist).

In an interval (3), in order to make a fine adjustment, the focus lens 101a is shifted to a fine adjustment AF evaluation value sampling position on the infinity side slightly from the in-focus peak position in coarse adjustment. In an interval (4), the focus lens 101a is shifted at 1 AF step (fine adjustment) per 1 VD, and simultaneously, fine adjustment AF evaluation value sampling is carried out so as to detect an in-focus peak. In an interval (5), the focus lens 101a is shifted to the in-focus peak position, that is, an in-focus position.

In FIG. 14, in an interval (1), the focus lens 101a is shifted from the closest focusing position to the infinity position in order to carry out AF evaluation value sampling. In an interval (2), the focus lens 101a is shifted at 1 AF step (fine adjustment) per 1 VD (1/30 second), and simultaneously, in the normal area, AF evaluation value sampling is carried out so as to detect an in-focus peak. In an interval (3), a no peak exists in the normal area; for this reason, subsequently, the focus lens 101a is shifted at 3 AF step (coarse adjustment) per 1 VD, and simultaneously, coarse adjustment AF evaluation value sampling is carried out so as to detect an in-focus peak.

In an interval (4), in order to make a fine adjustment, the focus lens 101a is shifted to a fine adjustment AF evaluation value sampling position on the infinity side slightly from the in-focus peak position in coarse adjustment. In an interval (5), the focus lens 101a is shifted at 1 AF step (fine adjustment) per 1 VD, and simultaneously, fine adjustment AF evaluation value sampling is carried out so as to detect an in-focus peak. In an interval (6), the focus lens 101a is shifted to the in-focus peak position, that is, an in-focus position.

In this case, an AF running time is 1656 mS in the case of FIG. 13, and is 1824 mS in the case of FIG. 14. Therefore, in the case of FIG. 13, it is possible to shorten the AF running time by about 10% as compared with the case of FIG. 14.

Figure 15:
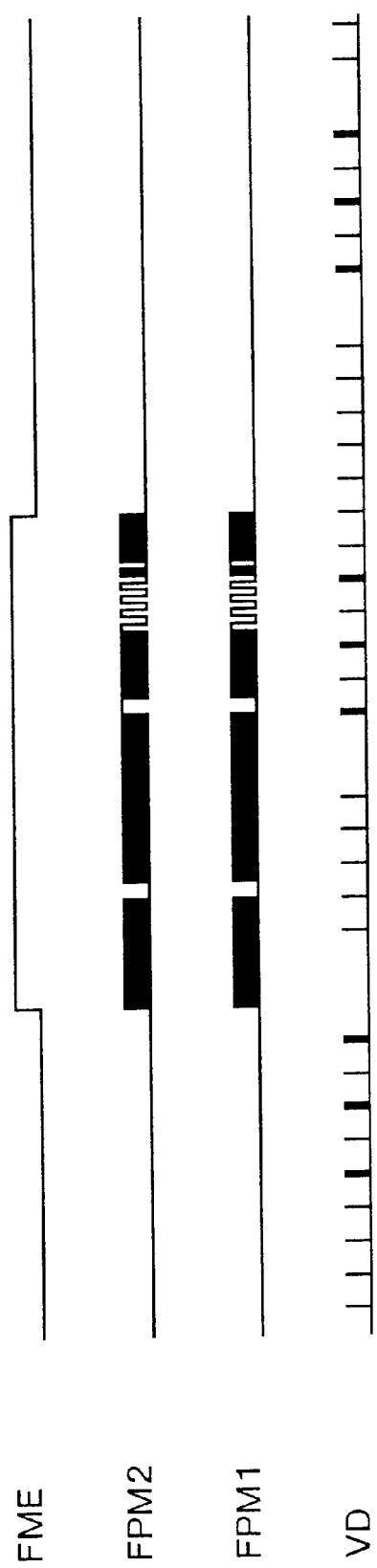
FIG. 15 is a timing chart of the case where a coarse adjustment is made in a macro area and a normal area in the case where a setting pixel aspect ratio is 900×600 pixels.

Next, the following is a description on the case where the setting pixel aspect ratio is 900×600 pixels. FIG. 15 is a timing chart in the case where the setting pixel aspect ratio is 900×600 pixels, and in the case where a coarse adjustment is made in the macro area and the normal area, and FIG. 16 is a timing chart in the case where the setting pixel aspect ratio is 900×600 pixels, and in the case where a coarse adjustment is made in the macro area and no coarse adjustment is made in the normal area. The case of FIG. 15 and FIG. 16 has the same operation as the case of FIG. 13 and FIG. 14 although is different in the setting pixel aspect ratio (pulse number in 1 AF step); therefore, the details are omitted. In this case, the AF running time is 1472 mS in the case of FIG. 15, and is 1496 mS in the case of FIG. 16. Therefore, in the case of FIG. 15, it is possible to shorten the AF running time by about 2% as compared with the case of FIG. 16.

As seen from the above description, in the case where the setting pixel aspect ratio is different, the AF running time is different. In addition to the setting pixel aspect ratio, the AF running time is different whether the AF evaluation value should be sampled to what degree in the fine adjustment from the peak position obtained in the coarse adjustment, in order to have the same AF accuracy as the case where no coarse adjustment is made, or whether the coarse adjustment should be made at an AF step how many times as much as the fine adjustment. Moreover, in addition to AF evaluation value sampling, the number of driving times of the focus lens 101a increases in the coarse adjustment; for this reason, a driving speed of the focus lens 101a has a relation with a focus shift rate for removing a back rush. Therefore, depending upon an AF setting method in accordance with setting conditions and AF evaluation values, it is determined whether or not the AF running time is shortened.

Next, the following is a description on the case of setting coarse adjustment/no coarse adjustment in accordance with an F-number of aperture in AF or in recording. In the case where the setting pixel aspect ratio is 1800×1200 pixels, when the F-number is F11 or less, the setting condition shown in FIG. 11 is used; on the other hand, when the F-number is F11 or more, the setting condition shown in FIG. 12 is used.

The F-number is determined by carrying out an AE control. More specifically, the IPP 107 outputs an AE evaluation value on the basis of a luminance signal, and the CPU 121 sets an F-number of aperture on the basis of the outputted AE evaluation value via the pulse motor 136 in monitoring. Moreover, the SG section 126 sets an electronic shutter second/time for resetting a storage charge of the CCD 103. In this case, in monitoring and in recording, a coupled range is different between an electronic shutter and a camera shutter; for this reason, the F-number is also different.

As is evident from the above description, in this embodiment, a user can arbitrarily selects no coarse adjustment mode and coarse adjustment mode. More specifically, in no coarse adjustment mode, the focus lens 101a is shifted, and then, the AF evaluation value is sampled at a fine step interval (e.g., 1 AF step), and thereafter, the peak position is detected from the sampled AF evaluation value so as to detect an in-focus position. In the coarse adjustment mode, the focus lens 101a is shifted, and the AF evaluation value is sampled at a coarse step interval, and thereafter, the peak position is detected from the sampled AF evaluation value so as to detect a roughly in-focus position. Subsequently, in the vicinity of the roughly in-focus position, the focus lens 101a is shifted, and then, the AF evaluation value is sampled at a fine step interval, and thereafter, the peak position is detected from the sampled AF evaluation value so as to detect a final in-focus position. Therefore, it is possible to realize the shortest AF running time in each photography scene.

Further, in this embodiment, the user sets a plurality of shifting ranges (camera-to-subject distance) of the focus lens 101a for sampling an AF evaluation value, and then, arbitrarily sets a sequence of detecting an in-focus position in the range set by the user, and thereafter, detects the in-focus position according the sequence. In the case where no in-focus position is found, the in-focus position is detected in the shifting range set in the next sequence. Therefore, for example, like a scenic area priority AF, a portrait area priority AF, a macro area priority AF, it is possible to preferentially perform an AF operation in the vicinity of camera-to-subject distance of each scene, and thus, to realize the shortest AF running time in the scene.

Further, in this embodiment, the user can arbitrarily set the coarse adjustment mode and no coarse adjustment mode for each set shifting range (camera-to-subject distance) of the focus lens 101a; therefore, it is possible to further reduce the AF running time. For example, in particular, in the closest focusing distance, the depth of field is shallow as compared with the vicinity of infinity; for this reason, the number of AF samplings increases as compared with the camera-to-subject distance. However, the user uses the coarse adjustment mode in the macro area, and thereby, it is possible to further reduce the AF running time.

Further, in this embodiment, in accordance with a camera-to-subject distance, a focal length, setting pixel aspect ratio, and an F-number, which have a relation with an increase and decrease of AF sampling number, the coarse adjustment mode and no coarse adjustment mode are automatically selected. Therefore, the user can realize an AF operation at an optimum (shortest) AF running time without spending a time for selection (setting).

According to a first aspect of the present invention, the autofocus apparatus has: a first mode of shifting the focus lens at a fine step interval so as to sample an AF evaluation value, and for detecting an in-focus position on the basis of a sampling AF evaluation value; and a second mode of shifting the focus lens at a coarse step interval so as to sample an AF evaluation value, and detecting a rough in-focus position on the basis of the sampling AF evaluation value, and subsequently, shifting the focus lens at a fine step interval so as to sample an AF evaluation value in the vicinity of the rough in-focus position, and detecting an in-focus position on the basis of the sampling AF evaluation value, and the autofocus apparatus can select the first mode and the second mode. Therefore, the user can arbitrarily select the first mode and the second mode, and thereby, it is possible to reduce an AF running time.

According to a second aspect of the present invention, a plurality of focus lens shifting ranges for sampling the AF evaluation value are set, and a sequence of detecting an in-focus position is set in each set shifting range, and further, according to the set sequence, the in-focus position is detected in the set shifting range. Therefore, the user can arbitrarily set a focus lens shifting range for sampling the AF evaluation value and the sequence of detecting the in-focus position in each set shifting range, and thereby, it is possible to reduce an AF running time.

According to a third aspect of the present invention, a plurality of focus lens shifting ranges for sampling the AF evaluation value are set, and a sequence of detecting an in-focus position is set in each set shifting range, and further, the in-focus position is detected in the set shifting range. The autofocus apparatus has: a first mode of shifting the focus lens at a fine step interval so as to sample an AF evaluation value, and for detecting an in-focus position on the basis of a sampling AF evaluation value; and a second mode of shifting the focus lens at a coarse step interval so as to sample an AF evaluation value, and detecting a rough in-focus position on the basis of the sampling AF evaluation value, and subsequently, shifting the focus lens at a fine step interval so as to sample an AF evaluation value in the vicinity of the rough in-focus position, and detecting an in-focus position on the basis of the sampling AF evaluation value. Further, the autofocus apparatus can select the first mode and the second mode for each shifting range set by the setting means, and detecting an in-focus position in each shifting range according to the sequence set by the setting means. Therefore, the user can arbitrarily set a focus lens shifting range for sampling the AF evaluation value and the sequence of detecting the in-focus position in each set shifting range, and further, can select the first mode and the second mode, and thereby, it is possible to reduce an AF running time.

According to a fourth aspect of the present invention, the first mode and the second mode is automatically selected-in accordance with a camera-to-subject distance. Therefore, in accordance with the camera-to-subject distance which is a factor of increasing and decreasing an AF evaluation value sampling number, it is possible to automatically select the first mode and the second mode, and thereby, to further reduce an AF running time.

According to a fifth aspect of the present invention, the first mode and the second mode are automatically selected in accordance with a focal length. Therefore, in accordance with the focal length which is a factor of increasing and decreasing an AF evaluation value sampling number, it is possible to automatically select the first mode and the second mode, and thereby, to further reduce an AF running time.

According to a sixth aspect of the present invention, the first mode and the second mode are automatically selected in accordance with a recording pixel aspect ratio. Therefore, in accordance with the recording pixel aspect ratio which is a factor of increasing and decreasing an AF evaluation value sampling number, it is possible to automatically select the first mode and the second mode, and thereby, to further reduce an AF running time.

According to a seventh aspect of the present invention, the first mode and the second mode are automatically selected in accordance with an F-number. Therefore, in accordance with the F-number which is a factor of increasing and decreasing an AF evaluation value sampling number, it is possible to automatically select the first mode and the second mode, and thereby, to further reduce an AF running time.

The present document incorporates by reference the entire contents of Japanese priority document, 11-242307 filed in Japan on Aug. 27, 1999.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An autofocus apparatus comprising:
   an image pickup device configured to convert a subject light via a lens system into an electric signal, and to output the electric signal as an image data;
   an A/D conversion unit configured to A/D-convert the image data into a digital image signal;
   an AF evaluation unit configured to output an AF evaluation value based on a high frequency component of a luminance signal of the digital image data;
   a sampling unit configured to sample the AF evaluation value obtained by said AF evaluation unit while shifting a focus lens position;
   a focus driving unit configured to detect an in-focus position based on the AF evaluation value sampling result obtained by said sampling unit;
   a first mode of shifting the focus lens at a fine step interval so as to sample an AF evaluation value, and to detect an in-focus position based on a sampling AF evaluation value; and
   a second mode of shifting the focus lens at a coarse step interval so as to sample an AF evaluation value, and to detect a rough in-focus position based on the sampling AF evaluation value, and subsequently, shifting the focus lens at a fine step interval so as to sample an AF evaluation value in the vicinity of the rough in-focus position, and to detect an in-focus position based on the sampling AF evaluation value,
   wherein the autofocus apparatus selects the first mode in areas other than a macro area and selects the second mode in the macro area.

2. The autofocus apparatus according to claim 1, wherein said autofocus apparatus automatically selects the first mode and the second mode.

3. The autofocus apparatus according to claim 1, wherein said autofocus apparatus automatically selects the first mode and the second mode in accordance with a focal length.

4. The autofocus apparatus according to claim 1, wherein said autofocus apparatus automatically selects the first mode and the second mode in accordance with a recording pixel aspect ratio.

5. The autofocus apparatus according to claim 1, wherein said autofocus apparatus automatically selects the first mode and the second mode in accordance with an F-number.

6. An autofocus apparatus comprising:
   an image pickup device configured to convert a subject light via a lens system into an electric signal, and to output the electric signal as an image data;
   an A/D conversion unit configured to A/D-convert the image data into a digital image signal;
   an AF evaluation unit configured to output an AF evaluation value based on a high frequency component of a luminance signal of the digital image data;
   a sampling unit configured to sample the AF evaluation value obtained by said AF evaluation unit while shifting a focus lens position;
   a focus driving unit configured to detect an in-focus position based on the AF evaluation value sampling result obtained by said sampling unit;
   a setting unit configured to set a plurality of focus lens shifting ranges for sampling the AF evaluation value, and to set a sequence of detecting an in-focus position in each set shifting range;
   a first mode of shifting the focus lens at a fine step interval so as to sample an AF evaluation value, and to detect an in-focus position on the basis of a sampling AF evaluation value; and
   a second mode of shifting the focus lens at a coarse step interval so as to sample an AF evaluation value, and to detect a rough in-focus position based on the sampling AF evaluation value, and subsequently, shifting the focus lens at a fine step interval so as to sample an AF evaluation value in the vicinity of the rough in-focus position, and to detect an in-focus position based on the sampling AF evaluation value,
   wherein the autofocus apparatus selects the first mode in areas other than a macro area and selects the second mode in the macro area for each shifting range set by said setting unit, and detects an in-focus position in each shifting range according to the sequence set by said setting.

7. The autofocus apparatus according to claim 6, wherein said autofocus apparatus automatically selects the first mode and the second mode.

8. The autofocus apparatus according to claim 6, wherein said autofocus apparatus automatically selects the first mode and the second mode in accordance with a focal length.

9. The autofocus apparatus according to claim 6, wherein said autofocus apparatus automatically selects the first mode and the second mode in accordance with a recording pixel aspect ratio.

10. The autofocus apparatus according to claim 6, wherein said autofocus apparatus automatically selects the first mode and the second mode in accordance with an F-number.

* * * * *